US012794932B1

(12) United States Patent
Fullen et al.

(10) Patent No.: US 12,794,932 B1
(45) Date of Patent: Nov. 10, 2026

(54) NETWORK THREAT MITIGATION USING APPROXIMATE MEMBERSHIP QUERY FILTERS

(71) Applicant: Amazon Technologies, Inc., Seattle, WA (US)

(72) Inventors: Wayne Alan Fullen, Falls Church, VA (US); Luke Kenneth Schubert, Edgewater, MD (US); Jared Sylvester, Ellicott City, MD (US); Evripidis Paraskevas, Washington, DC (US); Jacob Nguyen, Chicago, IL (US); Christopher Hamilton Lee, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 53 days.

(21) Appl. No.: 18/894,806

(22) Filed: Sep. 24, 2024

(51) Int. Cl.
*H04L 29/06* (2006.01)
*H04L 9/40* (2022.01)

(52) U.S. Cl.
CPC ...... *H04L 63/1441* (2013.01); *H04L 63/1416* (2013.01); *H04L 63/1425* (2013.01)

(58) Field of Classification Search
CPC ............. H04L 63/1441; H04L 63/1416; H04L 63/1425; H04L 63/14; H04L 63/1408; H04L 63/1433; H04L 63/1458; H04L 63/1491
See application file for complete search history.

(56) References Cited

U.S. PATENT DOCUMENTS

| | | | | |
|---|---|---|---|---|
| 11,531,666 | B1 | 12/2022 | Park et al. | |
| 11,663,058 | B1 | 5/2023 | Wojciak | |
| 2022/0086181 | A1* | 3/2022 | Richman | H04L 63/0892 |
| 2022/0094703 | A1* | 3/2022 | Bailey | H04L 63/1416 |
| 2024/0396871 | A1* | 11/2024 | Moore | H04L 63/0236 |
| 2024/0403428 | A1* | 12/2024 | Lal | G06F 21/566 |

OTHER PUBLICATIONS

Graham Cormode, "Count Min Sketch," (AT&T Labs-Research), 2009, pp. 511-516.
Bin Fan, et al., "The Cuckoo Filter: It's Better Than Bloom," https://www.usenix.org/system/files/nsdip13-paper6.pdf, pp. 1-1, 2013.
Bin Fan, et al., "Cuckoo Filter: Practically Better Than Bloom," ACM, https://pdl.cmu.edu/PDL-FTP/FS/cuckoo-conext2014.pdf, pp. 1-13, 2014.
"Bruce Maggs, et al., ""Algorithmic Nuggets in Content Delivery,"" ACM SIGCOMM Computer Communication Review, vol. 45, Issue 3pp. 52-66.https://doi.org/10.1145/2805789.2805800".
U.S. Appl. No. 18/067,684, filed Dec. 16, 2022, mChames Christopher Sorenson, III.

* cited by examiner

*Primary Examiner* — Malcolm Cribbs
(74) *Attorney, Agent, or Firm* — Alexander A. Knapp; Kowert, Hood, Munyon, Rankin & Goetzel, P.C.

(57) ABSTRACT

A network security manager may maintain data about entities which interact with a network by representing an identifier of a particular entity in one or more approximate membership query filters corresponding to a range for a data value associated with the identifier. The network security manager may quickly search large quantities of data to identify the range for the data value in order to determine whether to perform a threat mitigation operation.

20 Claims, 11 Drawing Sheets

NETWORK THREAT MITIGATION USING APPROXIMATE MEMBERSHIP QUERY FILTERS

BACKGROUND

A security system may receive and store large quantities of network data in a standard identifier-value format in which both the identifier and associated data value are fully represented in memory. The network data may provide information about entities which interact with the network and are associated with a particular identifier. The security system may search a standard identifier-value database for a particular identifier to locate the data value or values which are associated with the identifier. The database may require significant memory to maintain the network data, and the security system may experience latency when searching the database. Latency in a security system may inhibit the speed of the security system's response to detected threats.

Figure 1:
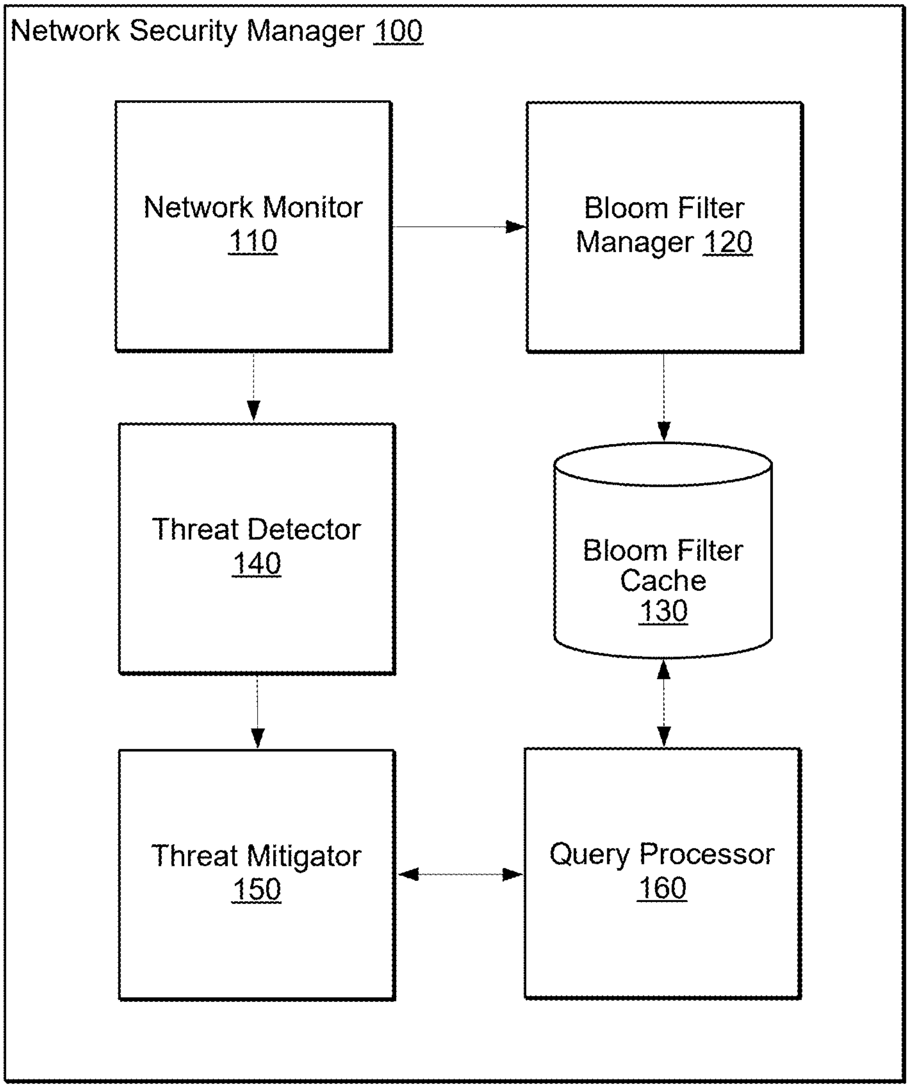
FIG. 1 is a block diagram of a network security manager using a Bloom filter cache to inform a threat mitigator, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION

A network security manager may use approximate membership query filters to efficiently store large amounts of network data. Network data may be data related to entities, associated with respective identifiers, which interact with a network. For example, an IP address may indicate a computing device which is interacting with the network. The network security manager may determine there is a likelihood that a particular computing device may pose a risk to a network, and the network security manager may check network data that is associated with the computing device's identifier to determine whether taking a threat mitigation action against the computing device may pose a risk to the network. The network security manager may be part of a security system which detects and mitigates risky activity within a network.

The network data may include information about how the entity associated with the identifier interacts with the network. For example, the network data may include a number of attempted connections between the entity and the network, a frequency of connection attempts, and one or more types of network traffic amounts. As a further example, one type of network traffic amount may include a value corresponding to the amount of data related to virtual computing that was sent between the computing device associated with the identifier and the network that the network security manager is monitoring. As another example, the network data may include a value corresponding to the overall amount of network traffic sent between the computing device and the network. In some embodiments, the network data may include a value corresponding to the amount of network traffic sent to the network from the computing device, or to the computing device from the network.

The network security manager may use the network data to determine whether a threat mitigation action is appropriate, and if so, which threat mitigation action is appropriate. For example, a high amount of network traffic may indicate that the computing device is performing a function for the network or for a client using the network. A computing device which provides many individuals, such as individuals working in an office, with access to the network may have an above average amount of network traffic. The network security manager may determine that the computing device is important to the network and may be risky to remove from the network. The network security manager may investigate the computing device in greater detail, may refrain from performing a threat mitigation action against the computing device, or may perform a reversible or limited threat mitigation action against the computing device. As another example, the network security manager may determine that a computing device which is associated with a smaller amount of network traffic is less risky to remove from the network and may remove the computing device from the network in response to detecting a possible threat from the computing device.

Some values related to network traffic may indicate risk from a computing device to the network should the computing device remain connected to the network. For example, a high number of failed connection attempts may indicate that a component of network security routinely makes a determination that the computing device is risky to connect to the network. The network security manager may determine, based on the identifier being associated with a high number of failed connections, that a more severe threat mitigation action is appropriate than the network security manager would otherwise select based on a lower number of failed connections.

The network security manager may store representations of the identifiers in approximate membership query filters, such as Bloom filters, which correspond to a range of the particular value being tracked. For example, the network security management may track overall traffic amounts using a set of Bloom filters and may track network-receiving traffic amounts using a different set of Bloom filters. The network security manager may represent the identifier in a first Bloom filter corresponding to a range for overall traffic amount and a second Bloom filter corresponding to a range for network-receiving traffic amount. The network security manager may need approximately an order of magnitude less memory space to store Bloom filters representing the network data than a database representing the network data.

The network security manager may use any approximate membership query filter, which are space-efficient probabilistic data structures which can be searched to determine whether an identifier is not in a filter or is probably in the filter with a known false positive rate. Examples of approximate membership query filters include Bloom filters, quotient filters, cuckoo filters, and xor filters. Approximate membership query filters may have common features, such as representing identifiers with a hash value, being space-efficient data storage, and answering whether an identifier is present with no false negatives and a known false positive rate. For simplicity, a Bloom filter is used as an example throughout this specification, but this is not meant to imply that other approximate membership query filters cannot be used.

The network security manager may query a set of Bloom filters corresponding to a value for a particular identifier to determine the range of the value for that identifier. For example, the network security manager may query a set of Bloom filers corresponding to a number of connection attempts. The network security manager may locate the identifier in a "low" range and may determine that the entity associated with the identifier is associated with a "low" number of connection attempts. A network security manager may take an amount of time that is approximately three orders of magnitude less to perform a parallel search of a set of Bloom filters for the identifier to locate associated data ranges than to perform a database search for the identifier to locate associated data values.

A Bloom filter may return a false positive at a configurable rate provided that the number of identifiers represented in the Bloom filter is below a number that was known or estimated at the time that an amount of memory for the Bloom filter was selected and allocated. A Bloom filter may be configured to not return false negatives. The network security manager may determine a result is a false positive based on returned values from other sets of Bloom filters. For example, an identifier may be found in a high overall traffic amount Bloom filter and a moderate overall traffic amount Bloom filter. The identifier may also be found in a moderate network-receiving traffic amount Bloom filter and may not be found in a set of network-sending traffic amount Bloom filters. The network security manager may determine that the high overall traffic amount return was a false positive for the identifier and the moderate overall traffic amount is the true range.

The network security manager may maintain Bloom filters for ranges of values which are relevant to the security of the network. For example, an identifier which has had minimal or no interaction with the network may not be represented in a Bloom filter corresponding to a low range. Additionally, the network security manager may maintain Bloom filters for ranges of values which indicate information about the entity corresponding to the identifier. For example, the network security manager may maintain Bloom filters for ranges of values which are moderate, high, and very high (i.e., above the maximum threshold for the "high" range). The network security manager may use different threat mitigation actions for a computing device corresponding to an identifier that has a value in the "moderate" range than for a computing device corresponding to an identifier that has a value in the "high" range. For example, the network security manager, upon detecting a possible threat from a computing device corresponding to an identifier that has a value in the "moderate" range, may disconnect the computing device from the network. The network security manager, upon detecting a possible threat from a computing device corresponding to an identifier that has a value in the "high" range, may allocate security resources to perform more thorough threat detection for the computing device.

The network security manager may monitor various types of network traffic information for various types of identifiers. For simplicity, this specification primarily uses the example of IP addresses as identifiers. Examples of types of identifiers the network security manager may include in approximate membership query filters include IP addresses using internet protocol version 4 (e.g., IPv4), IP addresses using internet protocol version 6 (e.g., IPv6), account IDs, instance IDs, resource identifiers (such as identifiers for storage buckets targeted to be accessed by the network traffic), and SSL/TLS information that provides indicators of a particular client engaged in the network traffic (such as JA3, JA4, etc. fingerprinting).

FIG. 1 is a block diagram of a network security manager using a Bloom filter cache to inform a threat mitigator, according to some embodiments.

Figure 9:
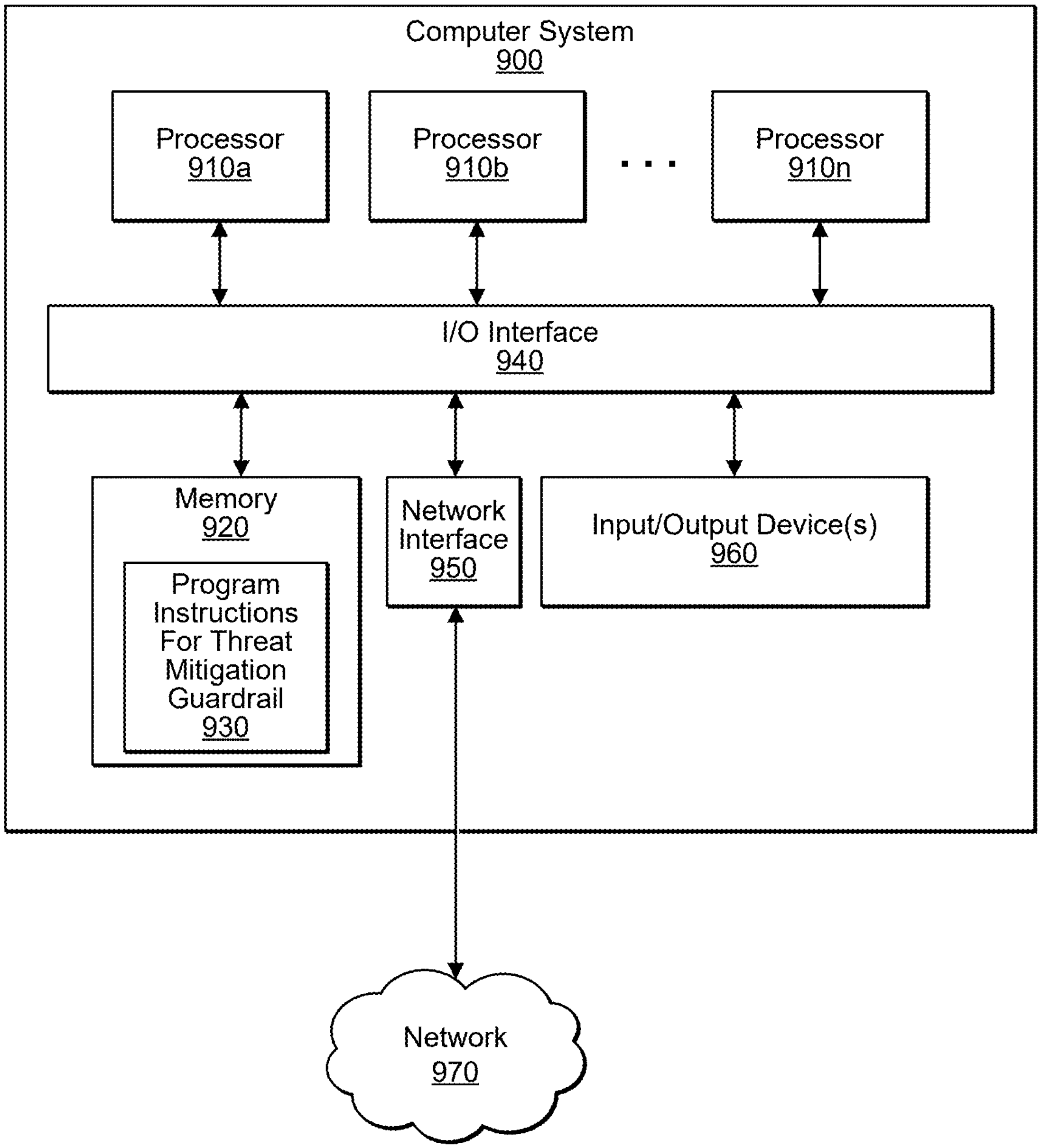
FIG. 9 is a block diagram illustrating an example computer system that implements some, or all, of the techniques described herein, according to some embodiments.

A network security manager 100 may be implemented by a computing system, such as computer system 900 as illustrated in FIG. 9. The network security manager 100 may use a network monitor 110 to generate network data, such as the amount of network traffic generated by an entity which is associated with an identifier. The network monitor 110 may associate a variety of types of activity with an identifier responsible for causing the activity. A Bloom filter manager 120 may select network data which is generated by the network monitor 110 for inclusion in a Bloom filter cache 130. For example, the network monitor 110 may generate network data which indicates that an entity associated with a particular IP address was responsible for generating 790 GB of database-related traffic for the network in a particular hour. The Bloom filter manager 120 may locate the set of Bloom filters in the Bloom filter cache corresponding to database-related traffic, locate the sub-set of Bloom filters corresponding to the particular hour, locate the particular Bloom filter corresponding to a range which includes 790 GB, and add a hash representation of the IP address to the particular Bloom filter. The Bloom filter manager 120 may periodically generate new sets of Bloom filters associated with various ranges for the values included in network data generated by the network monitor 110.

A threat detector 140 may determine that activity associated with an identifier, observed by the network monitor 110, is above a threshold level of risk. The threat detector 140 may inform a threat mitigator 150 of the identifier that is associated with the activity above a threshold level of risk. The threat detector 140 may perform no action for an identifier below the threshold level of risk. The threat mitigator 150 may perform a guardrail check of the identifier prior to taking a threat mitigation action by sending the identifier as a query to query processor 160. The threat mitigator 150 may perform the guardrail check to determine whether taking a threat mitigation action against the entity associated with the identifier is associated with a level of risk to the network. The threat mitigator 150 may select an appropriate threat mitigation action based on a determined level of risk to the network. An example of a threat mitigation action may be flagging an identifier for continued monitoring by a security system for future determinations of whether to perform an additional threat mitigation action. Another example of a threat mitigation action, for example in response to a determination that the identifier is important to the network, may be to take no further action with regard to the identifier.

Query processor 160 may generate a representation of the query identifier using the same method the Bloom filter manager 120 uses to add an identifier to a Bloom filter. For example, the query processor 160 may generate a hash of the IP address that is being queried to search a Bloom filter which may be the same as a hash the Bloom filter manager 120 would have generated if the IP address had been added to the Bloom filter. The query processor 160 may generate more than one representation of the query identifier, for example, a hash may depend on the size of the particular Bloom filter which the query processor 160 is searching. To search for one identifier the query processor 160 may generate multiple hashes which each correspond to a particular memory size of a Bloom filter. The query processor 160 may check a hash against a Bloom filter. The Bloom filter may have all portions of a hash, or less than all portions of the hash. When the Bloom filter has all portions of the hash, the query processor 160 may report to the threat mitigator 150 that the identifier has been found at the Bloom filter. The query processor may also report information about the Bloom filter (value, value range, time range, and false positive rate) to the threat mitigator 150. When the Bloom filter has less than all portions of a hash, the query processor 160 may report the identifier is not in the Bloom filter or may not report to the threat mitigator 150 for the particular Bloom filter.

A Bloom filter 130 may have a false positive rate which can be set in conjunction with the size of the Bloom filter and the number of identifiers which are to be represented in the Bloom filter. The Bloom filter manager 120 may precisely set the false positive rate by generating a Bloom filter with a known count of identifiers that are to be represented in the Bloom filter. In some embodiments the Bloom filter manager 120 may estimate a likely number of identifiers to be represented in Bloom filters of a set and may add identifiers to the appropriate Bloom filters of the set as the data for the identifiers is provided by the network monitor 110.

Figure 2A:
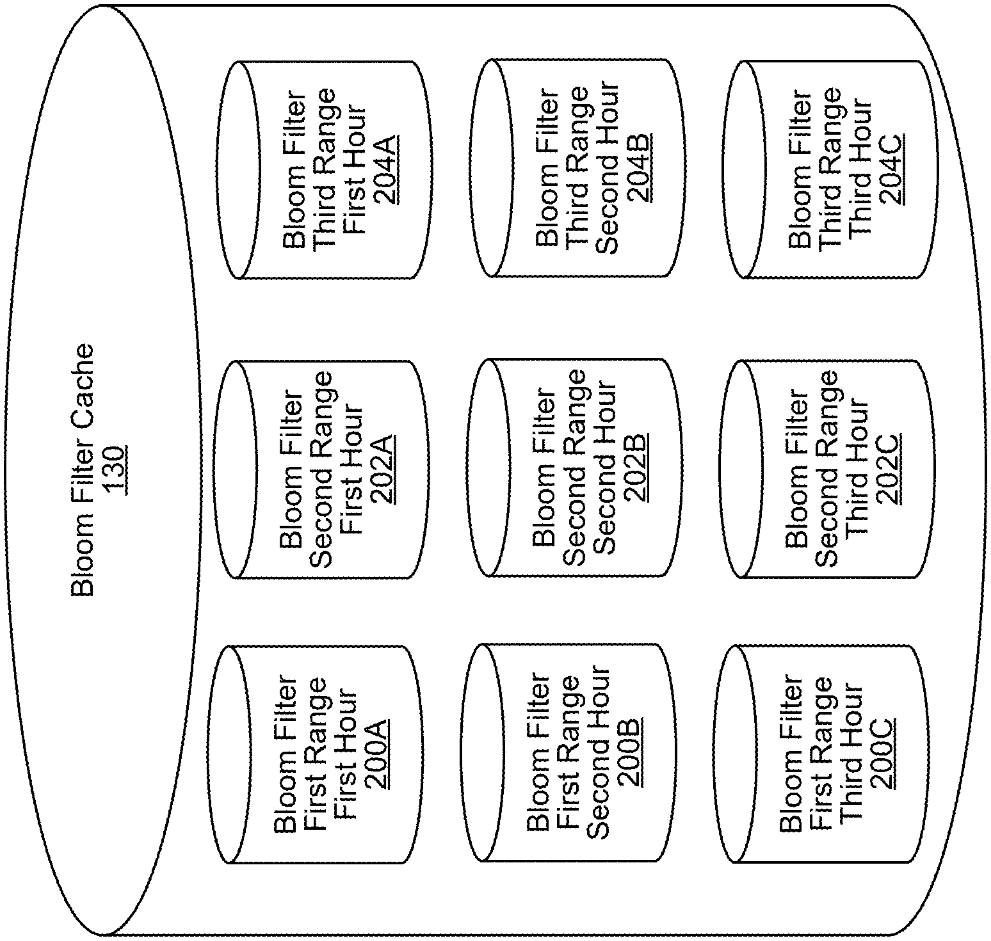
FIG. 2A is a representation of a Bloom filter cache at a first time, such as after data for three hours is recorded, according to some embodiments.

FIG. 2A is a representation of a Bloom filter cache at a first time, such as after data for three hours is recorded, according to some embodiments.

A Bloom filter cache 130 may hold multiple sets of Bloom filters. For one tracked value, the Bloom filter cache 130 may have a set of Bloom filters for each of the relevant ranges of the value (i.e., Bloom filter first range 200, Bloom filter second range 202, and Bloom filter third range 204). Each of these Bloom filter sets may include Bloom filters for multiple time ranges (i.e., Bloom filter first range first hour 200A, Bloom filter first range second hour 200B, and Bloom filter first range third hour 200C).

A network security manager may use individual Bloom filters for shorter time ranges than the overall time the network security manager tracks to enable more detailed analysis, a higher likelihood of catching false positives, and an updatable overall time frame. For example, for detailed analysis, the network security manager may determine that an identifier which consistently appears in a Bloom filter for the same range across multiple time subranges is likely to be exhibiting normal activity compared to an identifier which appears in Bloom filters for different ranges across different time periods. For example, for detecting false positives, the network security manager may determine that, of two Bloom filters for different ranges of the same time period the identifier appears in, the identifier is most likely to have been a false positive in the Bloom filter for a range that the identifier does not appear in across other time periods. For example, for an updatable overall timeframe, removing an identifier from a Bloom filter may be difficult or impractical, and the network security manager may maintain an updating overall time frame by adding a new Bloom filter for a new time subrange to the Bloom filter cache 130 and removing a Bloom filter corresponding to the oldest time subrange from the Bloom filter cache 130. For example, the network security manager may track a day of activity by maintaining twenty-four Bloom filters for a value and range of the value, each of the twenty-four Bloom filters corresponding to an hour. As another example, the network security manager may track a day of activity by maintaining four Bloom filters for a value and range of the value, each of the four Bloom filters corresponding to six hours.

The Bloom filter cache 130 illustrated in FIG. 2A tracks an overall period of three hours with three one-hour Bloom filters for each range. The number of Bloom filters the Bloom filter cache 130 maintains may be represented by the number of values multiplied by the number of ranges for the values multiplied by the number of time subranges. In some embodiments, the network security manager may use additional sub-categories, for example, sub-categories corresponding to portions of a network, such as a portion of a network which provides access to the network for a particular geographical region. As an example, network traffic for North America may correspond to a different region than network traffic in Europe.

A query processor may check sets of Bloom filters across categories to determine a complete answer. For example, the threat mitigator may need to know whether an identifier is associated with very high virtual compute-related traffic. Assuming that the Bloom filters illustrated in FIG. 2A correspond to virtual compute-related traffic and that the third range corresponds to the "very high" range, the query processor may check Bloom filter third range first hour 204A, Bloom filter third range second hour 204B, and Bloom filter third range third hour 204C. The query processor may return an answer to the threat mitigator that the identifier is associated with very high virtual compute-related traffic if the identifier is found in any of the three Bloom filters. The query processor may check all Bloom filters for the identifier and may return the information associated with the Bloom filter (value, value range, time, region, and any other category) to the threat mitigator for any Bloom filter with the identifier along with a false positive rate for the particular Bloom filters.

A Bloom filter manager may set the ranges for individual Bloom filters to account for divisions due to categorization. For example, if the range for "moderate" for a particular value corresponds to the 300 MB to 3 GB range for a three-hour time range, the range for "moderate" for each of three Bloom filters that correspond to three one-hour time subranges may be 100 MB to 1 GB.

Figure 2B:
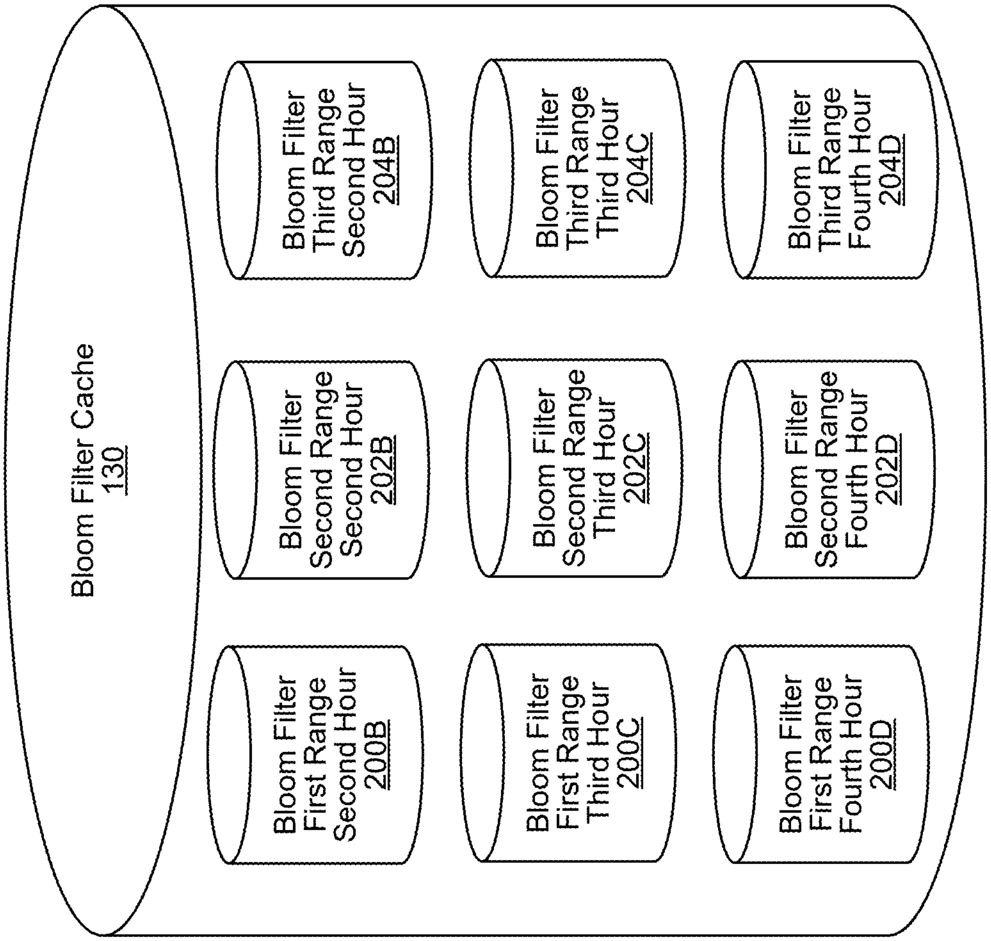
FIG. 2B is a representation of the Bloom filter cache at a second time, such as after additional data for a fourth hour is recorded and data for a first hour is removed, according to some embodiments.

FIG. 2B is a representation of the Bloom filter cache at a second time, such as after additional data for a fourth hour is recorded and data for a first hour is removed, according to some embodiments.

The Bloom manager has removed the Bloom filters for the first hour from the Bloom filter cache and has created Bloom filter first range fourth hour 200D, Bloom filter second range fourth hour 202D, and Bloom filter third range fourth hour 204D. The three-hour time range that the Bloom filter cache 130 maintains data for in FIGS. 2A &B has been moved forward by an hour. The Bloom filter manager may have determined that data older than three hours is unlikely to be useful in determining whether to perform a threat mitigation action. The Bloom filter manager may move forward an overall time window by generating new Bloom filters for a next time subrange and removing Bloom filters for an oldest time subrange. In some embodiments, the Bloom filter manager may cause the Bloom filter cache to retain particular Bloom filters which would otherwise be removed due to age for additional analysis requested by another component of a security system.

Figure 3A:
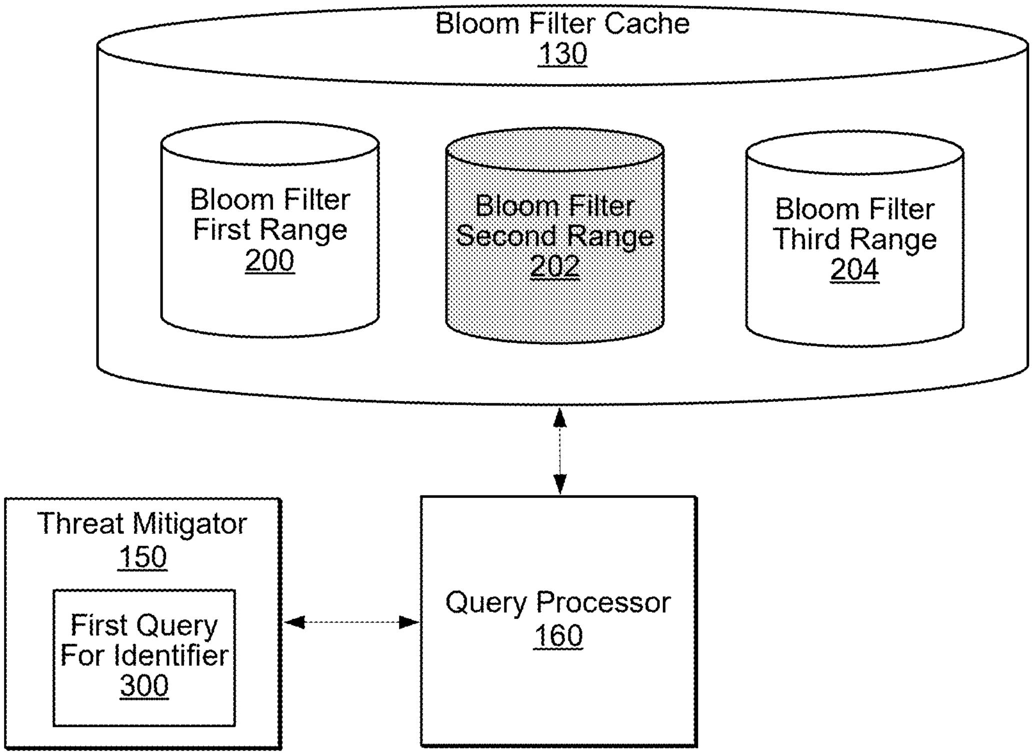
FIG. 3A is a block diagram illustrating a first query being run across Bloom filters of a Bloom filter cache, according to some embodiments.

FIG. 3A is a block diagram illustrating a first query being run across Bloom filters of a Bloom filter cache, according to some embodiments.

Figure 3B:
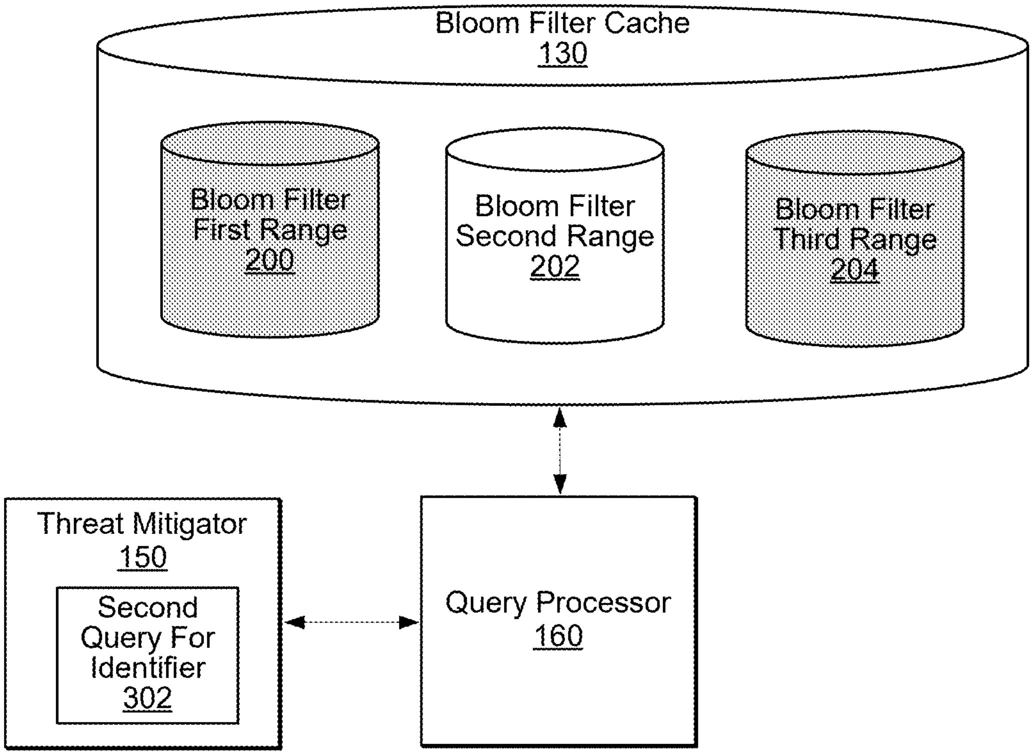
FIG. 3B is a block diagram illustrating a second query being run across Bloom filters of a Bloom filter cache, according to some embodiments.

The Bloom filter cache 130 as illustrated in FIGS. 3A & 3B maintains Bloom filter first range 200, Bloom filter second range 202, and Bloom filter third range 204. The Bloom filters may be sets of Bloom filters which are further divided into additional categories such as time subrange or region. The query processor 160 may query a set of individual Bloom filters to query a constructive Bloom filter, such as Bloom filter first range 200. A query processor 160 may determine an identifier is associated with a constructive Bloom filter if the identifier is found in any of the set of Bloom filters which make up the constructive Bloom filter. In some embodiments, the query processor 160 may add ranges of individual Bloom filters with the located identifier to obtain an overall range. For example, the query processor 160 may find an identifier in Bloom filters for different ranges across time subranges. The query processor 160 may sum the minimum values of the ranges and may sum the maximum values of the ranges to generate a range of the identifier's value for the total time range.

The threat mitigator 150 may provide queries, such as first query for identifier 300, to query processor 160. Query processor 160 may search Bloom filters in Bloom filter cache 130 for the identifier. Bloom filter second range 202 may contain a representation of the identifier that the threat mitigator 150 specified in the first query for identifier 300. The query processor 160 may report to the threat mitigator 150 that the value for the identifier is in the second range. The threat mitigator 150 may use the information that the value is in the second range to determine how to proceed in a threat mitigation action against an entity associated with the identifier.

FIG. 3B is a block diagram illustrating a second query being run across Bloom filters of a Bloom filter cache, according to some embodiments.

The threat mitigator 150 may provide the second query for identifier 302 to query processor 160. The query processor 160 may find the identifier in more than one Bloom filter, such as Bloom filter first range 200 and Bloom filter third range 204. For a particular time subrange, the value associated with the identifier is within one range of a set of non-overlapping ranges. If two Bloom filters both have a representation of the identifier, one of the two Bloom filters may be a false positive result.

The query processor 160 may report both results to the threat mitigator 150. The query processor 160 may also report the false positive rates of the individual Bloom filters, and additional information, such as other Bloom filters in which the query processor located the identifier. The threat mitigator 150 may make a determination regarding which of the results is a false positive. For example, assuming that the Bloom filters illustrated in FIG. 3B correspond to virtual compute-related traffic, that the first range corresponds to the "moderate" range, and that the third range corresponds to the "very high" range, the threat mitigator 150 may consider the network-receiving virtual compute-related traffic and network-sending virtual compute-related traffic for the identifier. The threat mitigator 150 may determine that the ranges of network-receiving virtual compute-related traffic and network-sending virtual compute-related traffic for the identifier sum to a range which overlaps with one of the "moderate" or "very high" ranges for virtual compute-related traffic, and that the other range is a false positive result.

The threat mitigator 150 may take both Bloom filter first range 200 and Bloom filter third range 204 as true for determining a threat mitigation action. For example, the threat mitigator 150 may take the more cautious action between a threat mitigation action associated with the first range and a threat mitigation action associated with the third range. For example, in response to a determination the value is in the first range, the threat mitigator 150 may have restricted the activity of an entity associated with the identifier. In response to a determination the value is in the third range, the threat mitigator 150 may have more closely analyzed the activity associated with the entity associated with the identifier. Closely analyzing the entity's activity may be a more cautious action than restricting the entity's activity, so the threat mitigator 150 may closely analyze the entity's activity.

Figure 4A:
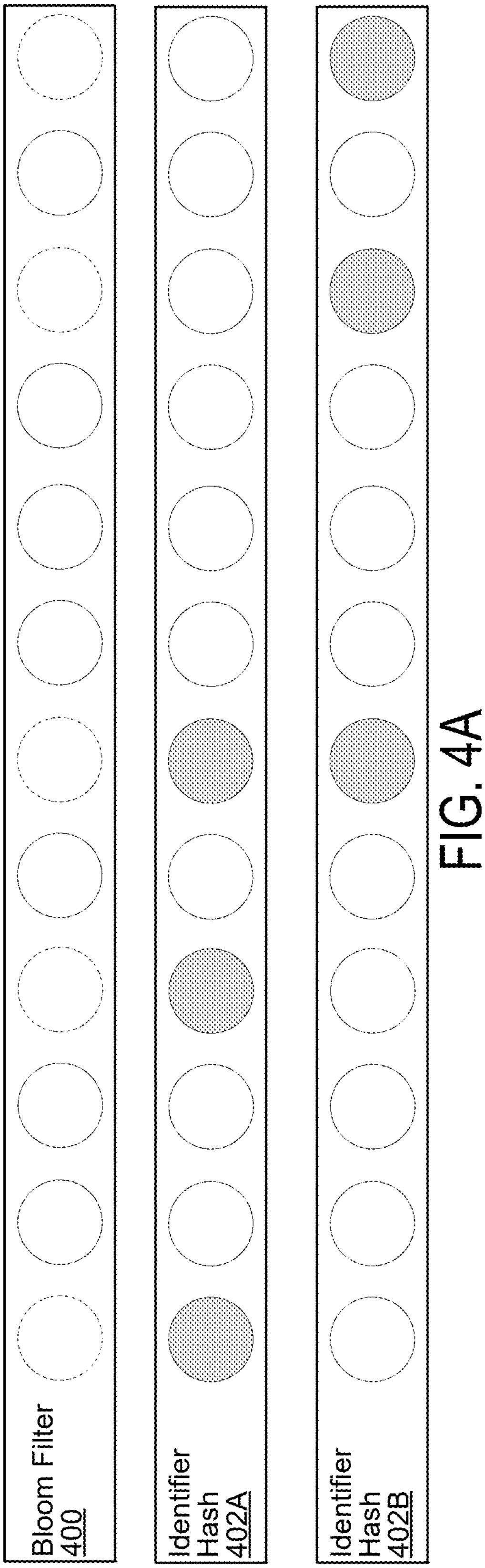
FIG. 4A is a bit map of a Bloom filter at a first time, such as while identifiers are being added the Bloom filter, according to some embodiments.

FIG. 4A is a bit map of a Bloom filter at a first time, such as while identifiers are being added the Bloom filter, according to some embodiments.

Figure 4B:
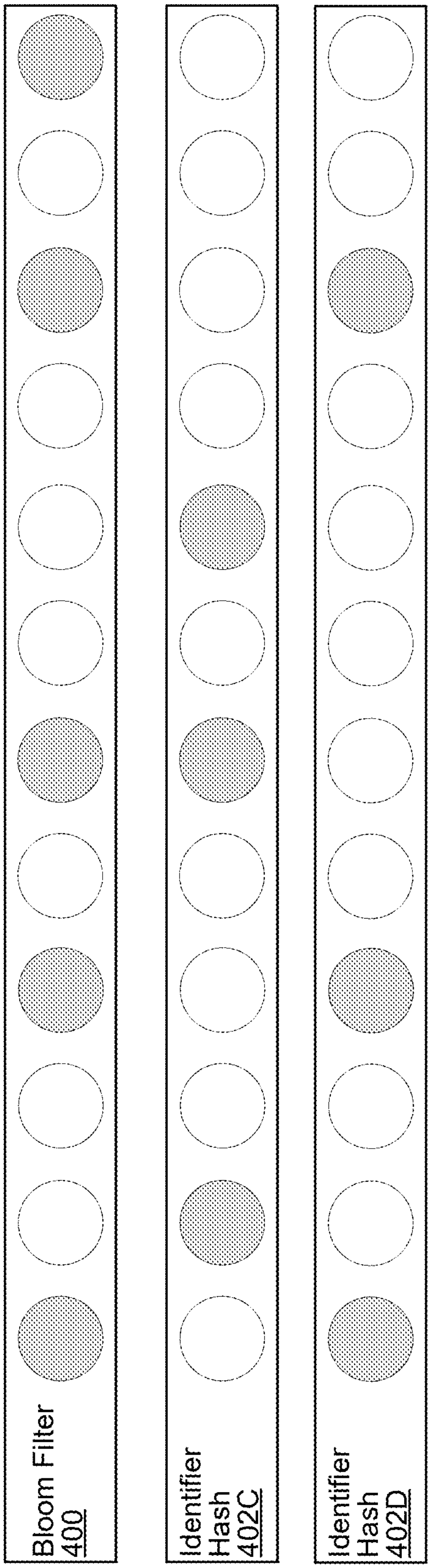
FIG. 4B is a bit map of the Bloom filter at a second time, such as while the Bloom filter is being checked for a query identifier, according to some embodiments.
Figure 4C:
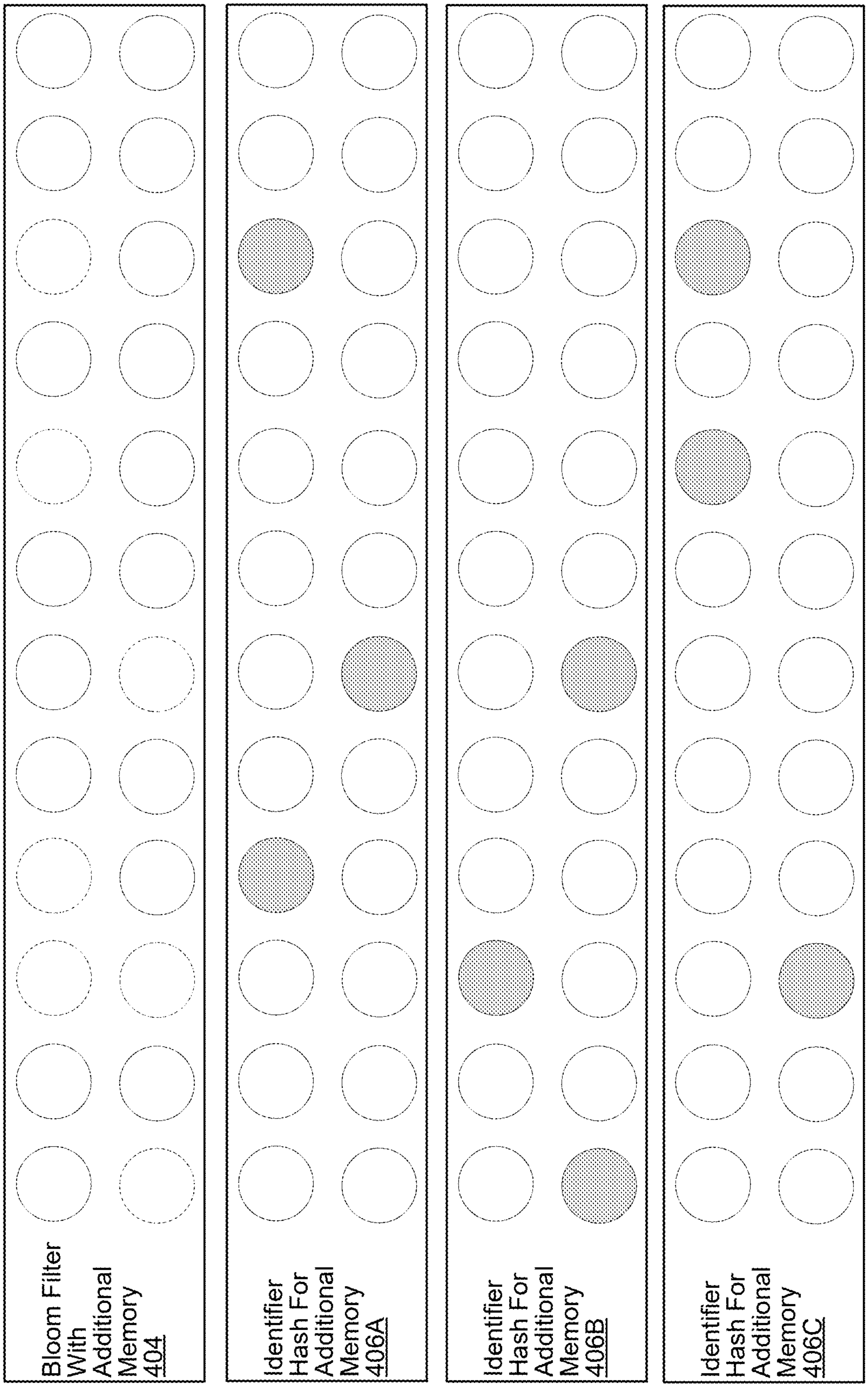
FIG. 4C is a bit map of a Bloom filter that has been allocated additional memory at the first time, such as while identifiers are being added to the Bloom filter, according to some embodiments.

Although the examples illustrated in FIGS. 4A-4C are Bloom filters, other approximate membership query filters may share relevant underlying elements of operation. A Bloom filter manager may generate an empty Bloom filter 400 (e.g., the Bloom filter may allocate memory for the Bloom filter and set all bits in the allocated memory to 0) and add identifier hashes 402. Identifier hashes 402 may correspond to the information the particular Bloom filter is tracking. For example, Bloom filter 400 may be a "moderate" range for the overall traffic value for a first hour for a first region. The Bloom filter manager may add identifier hash 402A and identifier hash 402B to the empty Bloom filter 400 upon receiving data that indicates the identifiers which were hashed to generate identifier hash 402A and identifier hash 402B correspond to the "moderate" range for the overall traffic value for the first hour for the first region.

The Bloom filter manager may add identifier hashes 402 to the Bloom filter 400 by setting each 1 bit for an identifier hash 402 to 1 in the Bloom filter 400 (e.g., set the bits represented by dashed circles to 1). As illustrated in FIGS. 4A-4C, grey dots correspond to 1 bits and white dots correspond to 0 bits. To add identifier hash 402A and identifier hash 402B to Bloom filter 400, the Bloom filter manager may set the first, fourth, sixth, tenth, and twelfth bits in the Bloom filter 400 to 1. Both identifier hash 402A and identifier hash 402B include the sixth bit. A bit which appears in multiple identifier hashes 402, such as the sixth bit, may be set to 1. The possibility of bit overlap may complicate removing an individual identifier from a Bloom filter.

FIG. 4B is a bit map of the Bloom filter at a second time, such as while the Bloom filter is being checked for a query identifier, according to some embodiments.

A query processor may check whether 1 bits of an identifier hash 402 are also 1 bits in a Bloom filter 400 to determine whether a Bloom filter manager generated the Bloom filter 400 using the identifier hash 402. The query processor may determine that an identifier hash 402 is not in the Bloom filter when one or more of the identifier hash's 1 bits correspond to a 0 bit of the Bloom filter 400. For example, identifier hash 402C includes the second and eighth bits at 1. The Bloom filter 400 has the second and eighth bits at 0. The query processor may be able to conclude the Bloom filter manager did not use identifier hash 402C to generate the Bloom filter 400, despite both the identifier hash 402C and Bloom filter 400 including the sixth bit at 1.

The query processor may find a false positive result when an identifier hash 402 includes 1 bits which overlap with the 1 bits of the Bloom filter 400. For example, identifier hash 402D has 1 bits at the first, fourth, and tenth bit, which correspond to 1 bits in the Bloom filter 400. The query processor may incorrectly determine that the Bloom filter manager generated the Bloom filter 400 using identifier hash 402D. The false positive rate may depend on the amount of memory allocated to the Bloom filter 400 and the amount of representations of identifiers added to the Bloom filter 400. The Bloom filter manager may select the amount of memory allocated to the Bloom filter 400 to keep the false positive rate below a selected maximum threshold.

FIG. 4C is a bit map of a Bloom filter that has been allocated additional memory at the first time, such as while identifiers are being added to the Bloom filter, according to some embodiments.

The Bloom filter manager may generate a Bloom filter with additional memory 404 in response to receiving a particular amount of identifiers to be organized in the Bloom filter. The Bloom filter manager may interpret receiving a large amount of identifiers corresponding to a particular range for a value as receiving a request to generate a Bloom filter with the particular amount of identifiers as the identifier capacity within a false positive threshold. The size of the Bloom filter may affect the way that the identifiers are represented, so the Bloom filter manager may generate the Bloom filter with additional memory 404 prior to generating identifier hashes for additional memory 406. The Bloom filter manager may select a larger size for a particular Bloom filter based on an estimated number of identifiers the Bloom filter will store. Bloom filters with an increased size may have a lower false positive rate than Bloom filters of a smaller size with the same amount of represented identifiers. In some embodiments, the Bloom filter manager may generate Bloom filters of a consistent size and may generate additional Bloom filters for a range in response to an unexpectedly large number of identifiers in order to keep the false positive rate below a threshold false positive rate.

The Bloom filter manager may add the identifier hashes for additional memory 406 to the Bloom filter with additional memory 404 by setting bits in the Bloom filter with additional memory 404 which correspond to 1 bits in any of the identifier hashes for additional memory 406 (e.g., the bits represented by dashed circles) to 1. The query processor may check the Bloom filter with additional memory 404 by representing query identifiers as identifier hashes for the appropriate memory size and checking bits in the Bloom filter which correspond to 1 bits in the identifier hash.

Figure 5:
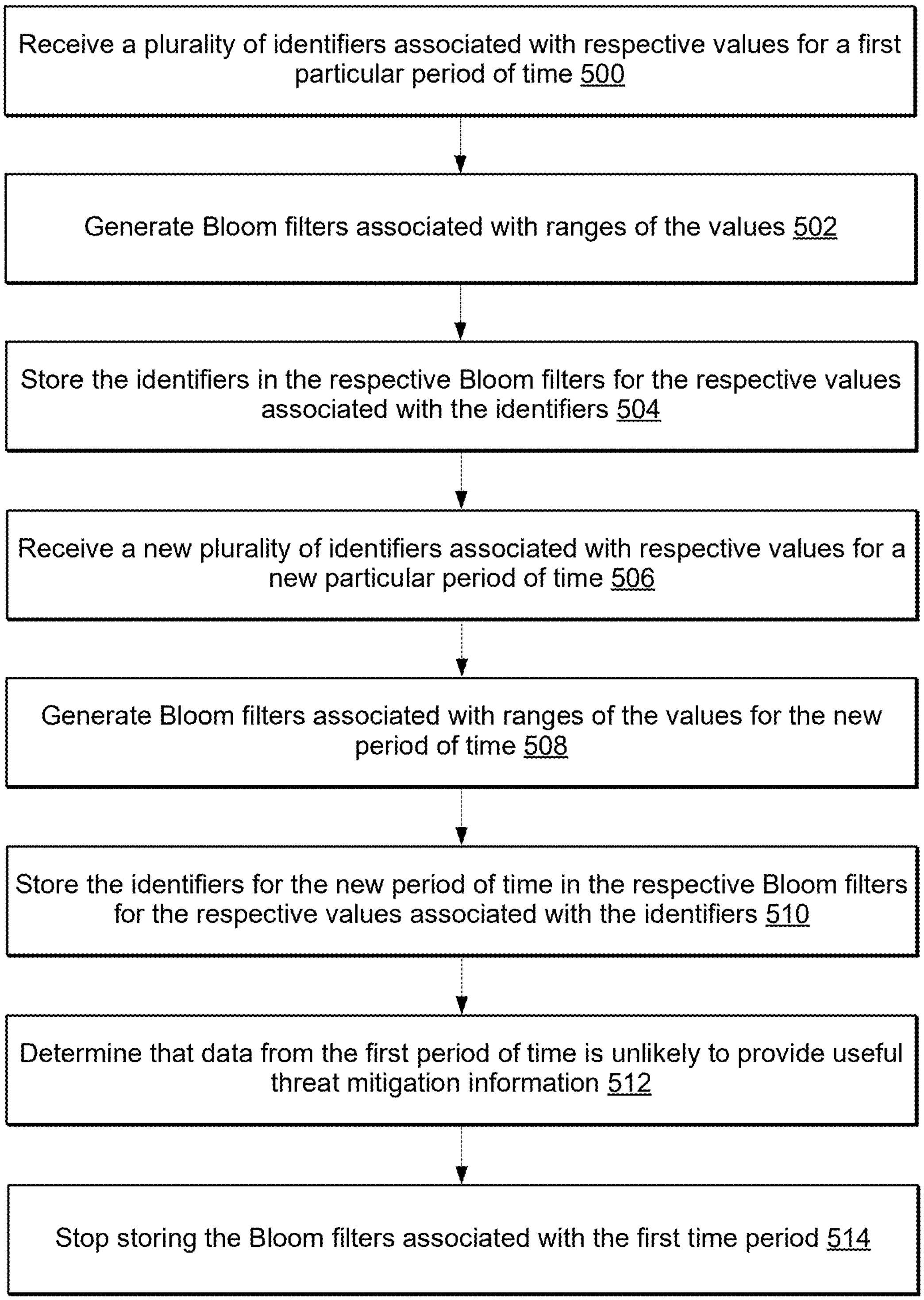
FIG. 5 is a flowchart illustrating a method for creating and updating a Bloom filter cache, according to some embodiments.

FIG. 5 is a flowchart illustrating a method for creating and updating a Bloom filter cache, according to some embodiments.

Figure 6:
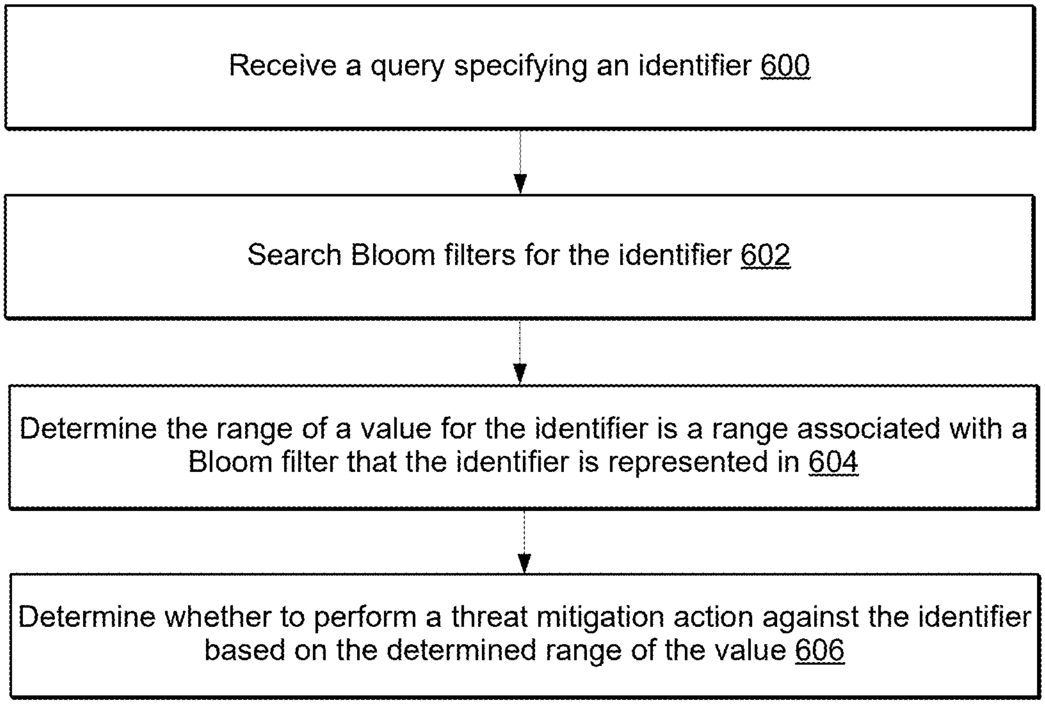
FIG. 6 is a flowchart illustrating a method for using Bloom filters as part of a threat mitigation decision, according to some embodiments.

FIGS. 5 & 6 refer to Bloom filters as a specific example of an approximate membership query filter. Other approximate membership query filters may be used in the methods described in FIGS. 5 & 6. At 500, a network security manager may receive a plurality of identifier associated with respective values for a first particular period of time. At 502, the network security manager may generate Bloom filters associated with ranges of the value. At 504, the network security manager may store the identifiers in the respective Bloom filters for the respective values associated with the identifiers. At 506, the network security manager may receive a new plurality of identifiers associated with respective values for a new particular period of time. At 508, the network security manager may generate Bloom filters associated with ranges of the values for the new period of time. At 510, the network security manager may store the identifiers for the new period of time in the respective Bloom filters for the respective values associated with the identifiers. At 512, the network security manager may determine that data from the first period of time is unlikely to provide useful threat mitigation information. At 514, the network security manager may stop storing the Bloom filters associated with the first time period.

FIG. 6 is a flowchart illustrating a method for using Bloom filters as part of a threat mitigation decision, according to some embodiments.

At 600, a network security manager may receive a query specifying an identifier. At 602, the network security manager may search a set of Bloom filters (such as the Bloom filters generated and managed as discussed in relation to FIG. 5) for the identifier. At 604, the network security manager may determine the range of a value for the identifier is a range associated with a Bloom filter that the identifier is represented in. At 606, the network security manager may determine whether to perform a threat mitigation action against an entity associated with the identifier based on the determined range of the value. The determination may include a determination of whether to perform any threat mitigation action and a determination whether to perform one threat mitigation action or a different threat mitigation action.

Figure 7:
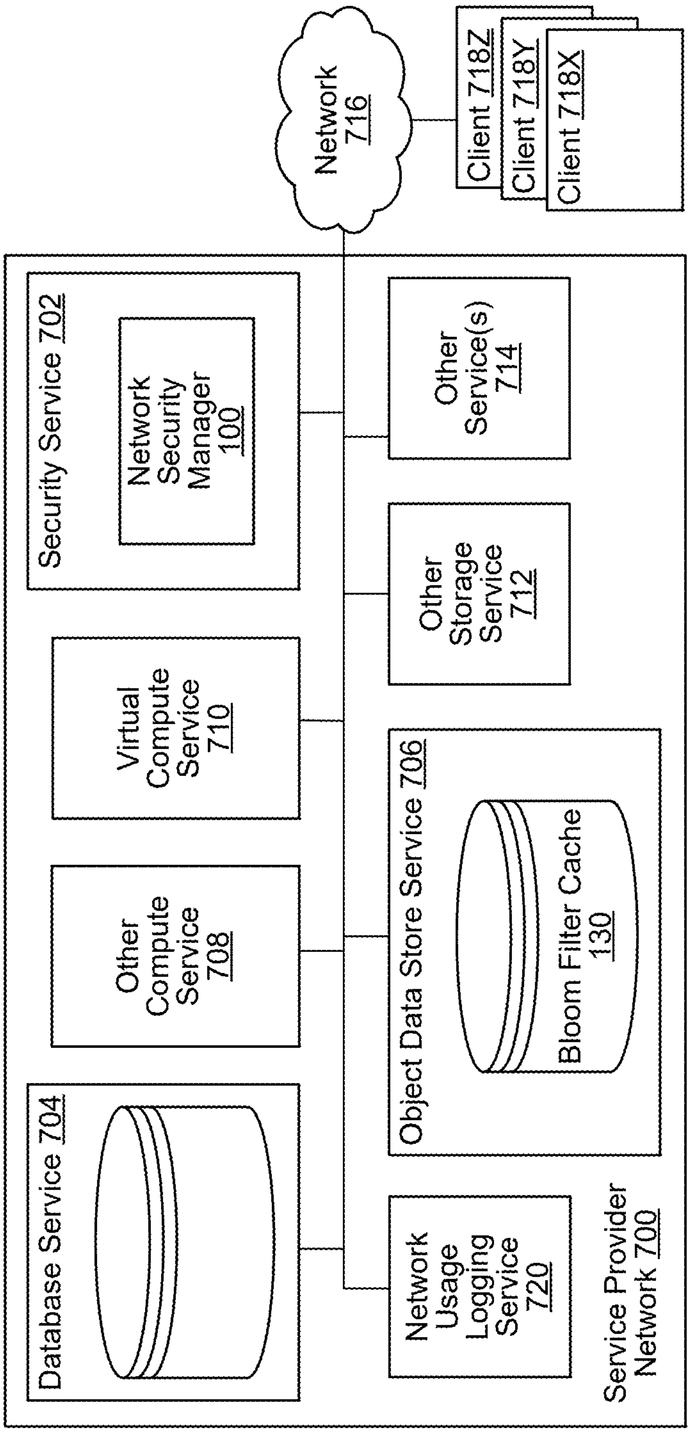
FIG. 7 illustrates a logical architecture of a service provider network as an example of a service that implements a network security manager, according to some embodiments.

FIG. 7 illustrates a logical architecture of a service provider network as an example of a service that implements a network security manager, according to some embodiments.

In the illustrated embodiment, service provider network 700 is connected via network 716 to clients 718X, 718Y, . . . , 718Z. In some embodiments the clients may include respective client networks connecting a plurality of various types of computer resources to the server provider network. A client may be an entity which is associated with an identifier. Service provider network 700 may include any number of various different types of service provider services, such as but not limited to security service 702, database service 704, other compute service 708, virtual compute service 710, network usage logging service 720, object data store service 706, other storage service 712, and other service(s) 714. These services may be implemented on provider network computing resources.

In some embodiments, various aspects of functionality described herein may be implemented by, or with, various ones of the service provider services. For example, functionality associated with the network security manager 100 may be implemented as part of a security service 702 provided by the service provider network 700. Further, the security service 702 may be implemented on a virtual compute service 710 and may monitor events occurring within the service provider network 700 and traffic between clients 718 and the service provider network 700. In some embodiments, various of the other components for implementing a network security manager 100 as illustrated in FIG. 1 may be implemented by various ones of the services of service provider network 700. For example, the Bloom filter cache 130 might be implemented via the object data store service 706. Also, computing resources needed to implement the network security manager 100 may be provided by virtual compute service 710. Network usage logging service 720 may store events and data that are to be analyzed by the network security manager 100 and other components of the security service 702 for detecting risk activity. A stream forwarder may push events and data from various components of the service provider network 700 to the network security manager 100.

Additionally, a client application may be built from the various resources provided by the services of service provider network 700 (e.g., via the other compute service 708 and the other storage service 712). Interactions between a client 718 and the client's application may be a source of traffic that is monitored and evaluated by the network security manager 100, as described herein.

Figure 8:
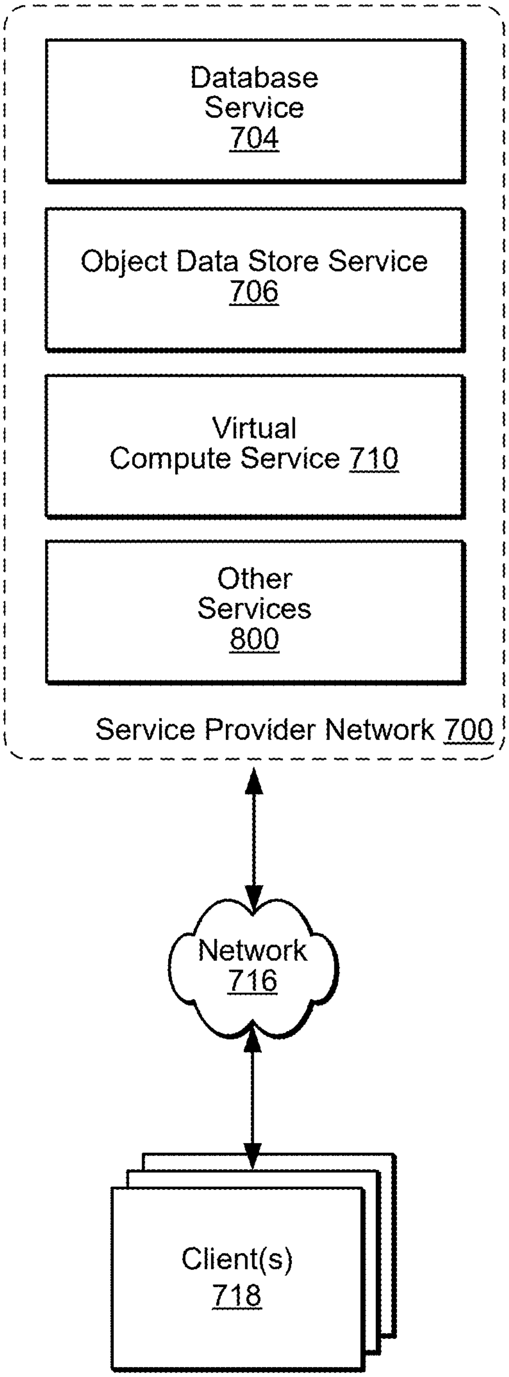
FIG. 8 is a block diagram illustrating a provider network that may implement techniques for monitoring entities which interact with the provider network, according to some embodiments.

FIG. 8 is a block diagram illustrating a provider network that may implement techniques for monitoring entities which interact with the provider network, according to some embodiments.

A service provider network 700 (sometimes referred to as a "cloud provider network" or "cloud") refers to a pool of network-accessible computing resources (such as compute, storage, and networking resources, applications, and services), which may be virtualized or bare-metal. The service provider network 700 can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network 716 (e.g., the Internet, a cellular communication network) and the hardware and software in cloud provider data centers that provide those services.

A service provider network 700 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the provider network via a publicly accessible network (e.g., the Internet, a cellular communication network) by way of a transit center (TC). TCs can be considered as the primary backbone locations linking users to the provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The provider network may deliver content from points of presence outside of, but networked with, these regions by way of edge locations and regional edge cache servers (points of presence, or PoPs). This compartmentalization and geographic distribution of computing hardware enables the provider network to provide low-latency resource access to users on a global scale with a high degree of fault tolerance and stability. Regions may each separately generate approximate query filters based on local region network traffic. Approximate query filters associated with a region may be shared to other regions using a hub and spoke method and may be stored in local caches.

The provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the provider network, which may be provisioned in user accounts.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

An exemplary provider network may include numerous provider network regions and so on that may include one or more data centers hosting various resource pools, such as collections of physical and/or virtualized computer servers, storage devices, networking equipment and the like (e.g., computing system 900 described below with regard to FIG. 9), needed to implement and distribute the infrastructure and storage services offered by the provider network within the provider network regions.

As illustrated in FIG. 8, a number of clients (shown as clients 718) may interact with a service provider network 700 via a network 716. Service provider network 700 may implement respective instantiations of the same (or different) services, such as a database service 704 for a first region and a second instantiation of database service 704 for a second region, and so on. Similar arrangements may be implemented for object data store service 706, as well as various other services such as virtual compute service 710 and other services 800. It is noted that where one or more instances of a given component may exist, reference to that component herein may be made in either the singular or the plural. However, usage of either form is not intended to preclude the other.

In various embodiments, the components illustrated in FIG. 8 may be implemented directly within computer hardware, as instructions directly or indirectly executable by computer hardware (e.g., a microprocessor or computer system), or using a combination of these techniques. For example, the components of FIG. 8 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 718 may encompass any type of client configurable to exchange data with service provider network 700 via network 716. For example, a given client 718 may include a suitable version of a web browser, or may include a plug-in module or other type of code module that may execute as an extension to or within an execution environment provided by a web browser. Alternatively, a client 718 may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 718 may be an application may interact directly with a service of a region of a provider network. In some embodiments, client 718 may generate network-based services requests according to a Representational State Transfer (REST)-style web services architecture, a document-based or message-based network-based services architecture, or another suitable network-based services architecture. Although not illustrated, some clients of service provider network 700 services may be implemented within a service of the provider network (e.g., a client application of database service 704 may be implemented on virtual compute service 710), in some embodiments. Therefore, various examples of the interactions discussed with regard to clients 718 may be implemented for internal clients as well, in some embodiments.

In some embodiments, a client 718 may be provided access to network-based storage of database data to other applications in a manner that is transparent to those applications. For example, client 718 may be integrated with an operating system or file system to provide storage in accordance with a suitable variant of the storage models described herein. However, the operating system or file system may present a different storage interface to applications, such as a conventional file system hierarchy of files, directories, and/or folders. In such an embodiment, applications may not need to be modified to make use of the storage system service model, as described above. Instead, the details of interfacing to the provider network may be coordinated by client 718 and the operating system or file system on behalf of applications executing within the operating system environment.

Clients 718 may convey network-based services requests to and receive responses from a region of the provider network via network 716. In various embodiments, network 716 may encompass any suitable combination of networking hardware and protocols necessary to establish network-based communications between clients 718 and a service provider network 700. For example, network 716 may generally encompass the various telecommunications networks and service providers that collectively implement the Internet. Network 716 may also include private networks such as local area networks (LANs) or wide area networks (WANs) as well as public or private wireless networks. For example, both a given client 718 and the provider network region may be respectively provisioned within enterprises having their own internal networks. In such an embodiment, network 716 may include the hardware (e.g., modems, routers, switches, load balancers, proxy servers, etc.) and software (e.g., protocol stacks, accounting software, firewall/security software, etc.) necessary to establish a networking link between given client 718 and the Internet as well as between the Internet and a provider network. It is noted that in some embodiments, clients 718 may communicate with regions of a provider network using a private network rather than the public Internet. For example, clients 718 may be provisioned within the same enterprise as a database service. In such a case, clients 718 may communicate with a provider network region entirely through a private network 716 (e.g., a LAN or WAN that may use Internet-based communication protocols but which is not publicly accessible).

Generally speaking, service provider network 700 may implement one or more service endpoints may receive and process network-based services requests, such as requests to access a database (e.g., queries, inserts, updates, etc.) and/or manage a database (e.g., create a database, configure a database, etc.). For example, a provider network region may include hardware and/or software may implement a particular endpoint, such that an HTTP-based network-based services request directed to that endpoint is properly received and processed. In one embodiment, a provider network region may be implemented as a server system may receive network-based services requests from clients 718 and to forward them to components of a system that implements database service 704, object data store service 706, and/or virtual compute service 710 for processing. In other embodiments, provider network region may be configured as a number of distinct systems (e.g., in a cluster topology) implementing load balancing and other request management features may dynamically manage large-scale network-based services request processing loads. In various embodiments, a provider network region may support REST-style or document-based (e.g., SOAP-based) types of network-based services requests.

In addition to functioning as an addressable endpoint for clients' network-based services requests, in some embodiments, a service provider network 700 may implement various client management features. For example, service provider network 700 may coordinate the metering and accounting of client usage of network-based services, including storage resources, such as by tracking the identities of requesting clients 718, the number and/or frequency of client requests, the size of data tables (or records thereof) stored or retrieved on behalf of clients 718, overall storage bandwidth used by clients 718, class of storage requested by clients 718, or any other measurable client usage parameter. In some embodiments, these client usage parameters may be tracked using Bloom filters. Provider network regions may also implement financial accounting and billing systems, or may maintain a database of usage data that may be queried and processed by external systems for reporting and billing of client usage activity. In certain embodiments, provider network regions may collect, monitor and/or aggregate a variety of storage service system operational metrics, such as metrics reflecting the rates and types of requests received from clients 718, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments, such metrics may be used by system administrators to tune and maintain system components, while in other embodiments such metrics (or relevant portions of such metrics) may be exposed to clients 718 to enable such clients to monitor their usage of database service 704, object data store service 706 and/or virtual compute service 710 (or the underlying systems that implement those services).

In some embodiments, provider network regions may also implement user authentication and access control procedures. For example, for a given network-based services request to access a particular database table, a provider network region may ascertain whether the client 718 associated with the request is authorized to access the particular database table. Provider network regions may determine such authorization by, for example, evaluating an identity, password or other credential against credentials associated with the particular database table, or evaluating the requested access to the particular database table against an access control list for the particular database table. For example, if a client 718 does not have sufficient credentials to access the particular database table, the provider network region may reject the corresponding network-based services request, for example by returning a response to the requesting client 718 indicating an error condition. Various access control policies may be stored as records or lists of access control information by database services 704, object data store service 706, and/or virtual compute services 710.

Note that in many of the examples described herein, services, like database service 704 or object data store service 706 may be internal to a computing system or an enterprise system that provides services to clients originating from the service provider network 700, and may not be exposed to external clients 718 (e.g., users or client applications). In such embodiments, the internal "client" (e.g., database service 704) may access object data store service 706 over a local or private network (e.g., through an API directly between the systems that implement these services). In some embodiments, a virtual compute service 710 may receive or use data from object data store service 706 (e.g., through an API directly between the virtual compute service 710 and object data store service 706) to store objects used in performing virtual compute services 710 on behalf of a client 718. In some cases, the accounting and/or credentialing services of provider network region may be unnecessary for internal clients such as administrative clients or between service components within the same enterprise.

Example Computer System

FIG. 9 is a block diagram illustrating an example computer system that implements some or all of the techniques described herein, according to some embodiments.

FIG. 9 illustrates exemplary computer system 900 usable to implement the threat mitigation guardrail as described above with reference to FIGS. 1-8. In different embodiments, computer system 900 may be any of various types of devices, including, but not limited to, a network computer, a mobile device, a consumer device, application server, storage device, a peripheral device such as a switch, modem, router, or in general any type of computing or electronic device.

Various embodiments of program instructions for a threat mitigation guardrail, as described herein, may be executed in one or more computer systems 900, which may interact with various other devices. Note that any component, action, or functionality described above with respect to FIGS. 1-8 may be implemented on one or more computers configured as computer system 900 of FIG. 9, according to various embodiments. In the illustrated embodiment, computer system 900 includes one or more processors 910 coupled to a system memory 920 via an input/output (I/O) interface 940. Computer system 900 further includes a network interface 950 coupled to I/O interface 940, and one or more input/output devices 960. In some cases, it is contemplated that embodiments may be implemented using a single instance of computer system 900, while in other embodiments multiple such computer systems, or multiple nodes making up computer system 900, may be configured to host different portions or instances program instructions as described above for various embodiments. For example, in one embodiment some elements of the program instructions may be implemented via one or more nodes of computer system 900 that are distinct from those nodes implementing other elements.

In some embodiments, computer system 900 may be implemented as a system on a chip (SoC). For example, in some embodiments, processors 910, memory 920, I/O interface 940 (e.g., a fabric), etc. may be implemented in a single SoC comprising multiple components integrated into a single chip. For example, a SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 920 may be configured to store compression or decompression program instructions for a threat mitigation guardrail 930 accessible by one or more of the processors 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions for a threat mitigation guardrail 930 may be configured to implement any of the functionality described above. In some embodiments, program instructions and/or data may be received, sent, or stored upon different types of computer-accessible media or on similar media separate from system memory 920 or computer system 900.

In one embodiment, I/O interface 940 may be configured to coordinate I/O traffic between processor 910, system memory 920, and any peripheral devices in the device, including network interface 950 or other peripheral interfaces, such as input/output devices 960. In some embodiments, I/O interface 940 may perform any necessary protocol, timing, or other data transformations to convert data signals from one component (e.g., system memory 920) into a format suitable for use by another component (e.g., processor 910). In some embodiments, I/O interface 940 may include support for devices attached through various types of peripheral buses, such as a variant of the Peripheral Component Interconnect (PCI) bus standard or the Universal Serial Bus (USB) standard, for example. In some embodiments, the function of I/O interface 940 may be split into two or more separate components, such as a north bridge and a south bridge, for example. Also, in some embodiments, some or all of the functionality of I/O interface 940, such as an interface to system memory 920, may be incorporated directly into processor 910.

Network interface 950 may be configured to allow data to be exchanged between computer system 900 and other devices attached to a network 970 (e.g., carrier or agent devices) or between nodes of computer system 900. Network 970 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 950 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 960 may, in some embodiments, include one or more display terminals, keyboards, keypads, touchpads, scanning devices, voice or optical recognition devices, or any other devices suitable for entering or accessing data by one or more computer systems 900. Multiple input/output devices 960 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 950.

As shown in FIG. 9, memory 920 may include program instructions for a threat mitigation guardrail 930, which may be processor-executable to implement any element or action described above. In one embodiment, the program instructions may implement the methods described above. In other embodiments, different elements and data may be included.

Computer system 900 may also be connected to other devices that are not illustrated, or instead may operate as a stand-alone system. In addition, the functionality provided by the illustrated components may in some embodiments, be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:

a network security manager, comprising one or more processors, and wherein the network security manager is configured to:

operate a network monitor comprising one or more processors, the network monitor configured to:

generate data about entities that use a network, wherein for an entity the data includes an identifier and a value that is useable in a determination to perform a threat mitigation action;

operate a set of approximate membership query filters, wherein a particular approximate membership query filter corresponds to a range for the value, and wherein the particular approximate membership query filter is configured to store a representation of the identifier;

receive the identifier as a query;

use the set of approximate membership query filters to determine the range of a value associated with the identifier; and cause the threat mitigation action to be performed for the identifier based on the range of the value.

2. The system of claim 1, wherein the identifiers are internet protocol addresses.

3. The system of claim 1, wherein the value is an amount of network traffic associated with the entity using the identifier.

4. The system of claim 1, wherein said determining the range of the value associated with the identifier is performed by querying respective ones of the approximate membership query filters for the particular identifier, wherein different ones of the respective approximate membership query filters correspond with different ones of the respective ranges of the values related to network traffic, wherein querying a given approximate membership query filter with the particular identifier provides a result indicating whether the identifier has a network traffic value corresponding to a given range associated with the given approximate membership query filter.

5. The system of claim 1, wherein the threat mitigation action is that the identifier is to be flagged for further analysis with regard to performance of another mitigation action based on the particular range determined using the respective approximate membership query filters.

6. The system of claim 1, wherein the approximate membership query filters each have a respective false positive rate that is below a threshold false positive rate value, wherein an overall number of approximate membership query filters to be used and an identifier capacity of the respective approximate membership query filters are selected based on the threshold false positive rate value and a number of identifiers to be represented by the respective ones of the approximate membership query filters.

7. A method, comprising:

receiving, at a network security manager, a plurality of identifiers associated with respective values related to network traffic, wherein a value is useable in a determination to perform a threat mitigation action;

organizing, by the network security manager, the plurality of identifiers in respective approximate membership query filters, wherein the respective approximate membership query filters correspond to respective ranges of the values related to network traffic;

receiving, at the network security manager, a particular identifier as a query;

determining, using the respective approximate membership query filters, that the particular identifier is associated with a particular range of the respective ranges; and causing the threat mitigation action to be performed for the particular identifier based on the particular range of the value.

8. The method of claim 7, wherein the identifiers are internet protocol addresses.

9. The method of claim 7, wherein the respective values are amounts of network traffic associated with the respective identifiers.

10. The method of claim 7, wherein the approximate membership query filters are Bloom filters.

11. The method of claim 7, wherein said determining the particular range of the value associated with the particular identifier is performed by querying respective ones of the approximate membership query filters for the particular identifier, wherein different ones of the respective approximate membership query filters correspond with different ones of the respective ranges of the values related to network traffic, wherein querying a given approximate membership query filter with the particular identifier provides a result indicating whether the identifier has a network traffic value corresponding to a given range associated with the given approximate membership query filter.

12. The method of claim 7, further comprising:

generating additional approximate membership query filters corresponding to the respective ranges of the values, wherein the approximate membership query filters correspond to a first time period and the additional approximate membership query filters correspond to a second time period;

determining that information from the first time period is less useable in the determination to perform the threat mitigation action than information from the second time period; and discarding the approximate membership query filters corresponding to the first time period.

13. The method of claim 7, wherein the threat mitigation action is that the identifier is to be flagged for further analysis with regard to performance of another mitigation action based on the particular range determined using the respective approximate membership query filters.

14. The method of claim 7, wherein the approximate membership query filters each have a respective false positive rate that is below a threshold false positive rate value, wherein an overall number of approximate membership query filters to be used and an identifier capacity of the respective approximate membership query filters are selected based on the threshold false positive rate value and a number of identifiers to be represented by the respective ones of the approximate membership query filters.

15. The method of claim 7, wherein said organizing the plurality of identifiers in the respective approximate membership query filters comprises:

representing each identifier of the plurality of identifiers as a hash value; and adding respective hash values to respective approximate membership query filters corresponding to the respective ranges of the values that are associated with the respective identifiers.

16. A non-transitory computer-readable storage medium storing program instructions that, when executed on or across one or more processors, cause the one or more processors to:

receive a plurality of identifiers associated with respective values related to network traffic, wherein a value is useable in a determination to perform a threat mitigation action;

organize the plurality of identifiers in respective approximate membership query filters, wherein the respective approximate membership query filters correspond to respective ranges of the values related to network traffic;

receive a particular identifier as a query;

determine, using the respective approximate membership query filters, that the particular identifier is associated with a particular range of the respective ranges; and cause the threat mitigation action to be performed for the particular identifier based on the particular range of the value.

17. The computer-readable storage media of claim 16, wherein the approximate membership query filters are Bloom filters.

18. The computer-readable storage media of claim 16, wherein said determining the particular range of the value associated with the particular identifier performed by querying respective ones of the approximate membership query filters for the particular identifier, wherein different ones of the respective approximate membership query filters correspond with different ones of the respective ranges of the values related to network traffic, wherein querying a given approximate membership query filter with the particular identifier provides a result indicating whether the identifier has a network traffic value corresponding to a given range associated with the given approximate membership query filter.

19. The computer-readable storage media of claim 16, wherein the program instructions, when executed on or across the one or more processors, further cause the one or more processors to:

generate additional approximate membership query filters corresponding to the respective ranges of the values, wherein the approximate membership query filters correspond to a first time period and the additional approximate membership query filters correspond to a second time period;

determine that information from the first time period is less useable in the determination to perform the threat mitigation action than information from the second time period; and discard the approximate membership query filters corresponding to the first time period.

20. The computer-readable storage media of claim 16, wherein the threat mitigation action is that the identifier is to be flagged for further analysis with regard to performance of another mitigation action based on the particular range determined using the respective approximate membership query filters.

* * * * *